March 26, 1946.   J. W. KELLY   2,397,270
HYDRAULIC REMOTE CONTROL SYSTEM
Filed Feb. 26, 1944    2 Sheets-Sheet 1
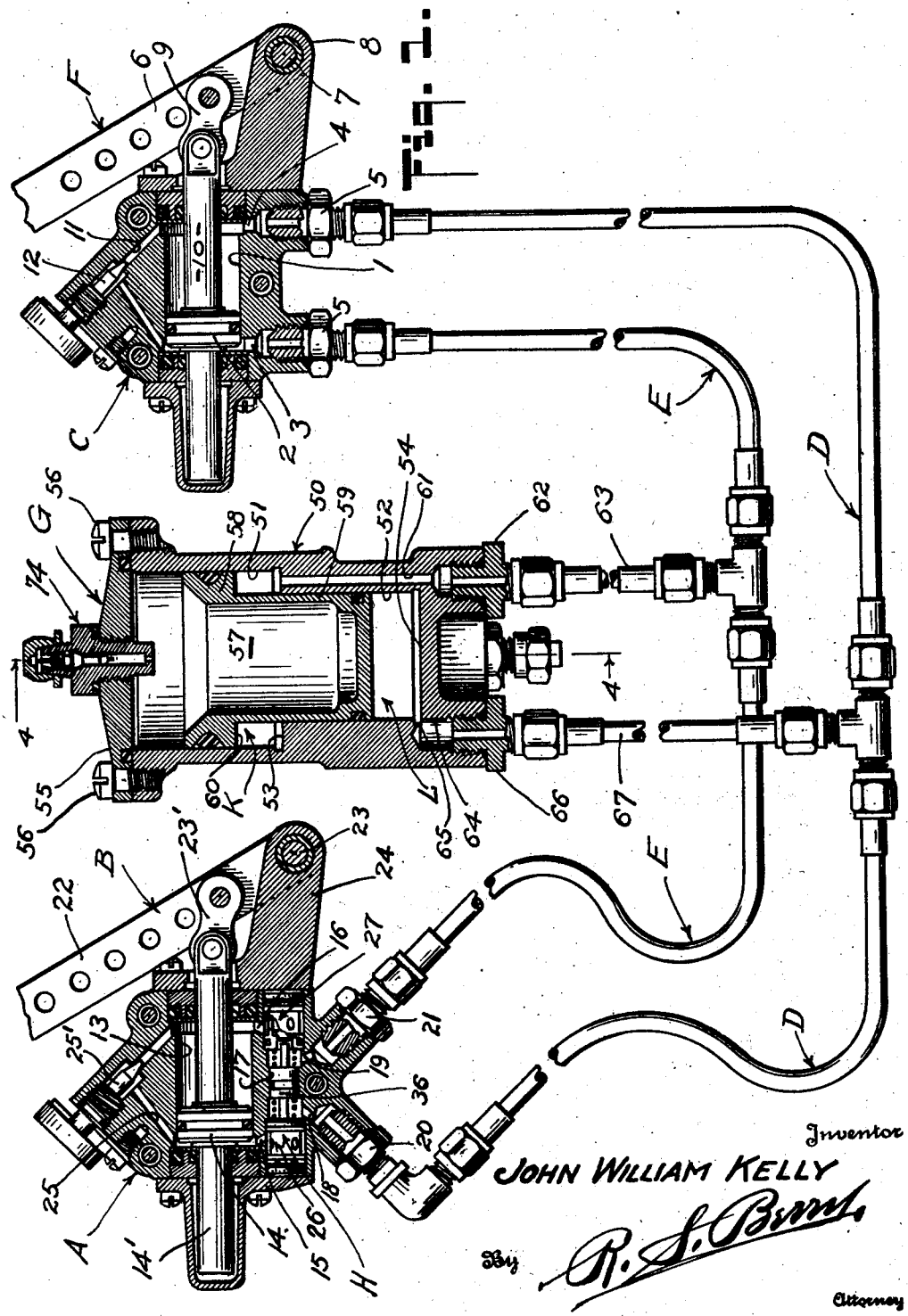
Inventor
JOHN WILLIAM KELLY
By R. S. Byrnes
Attorney

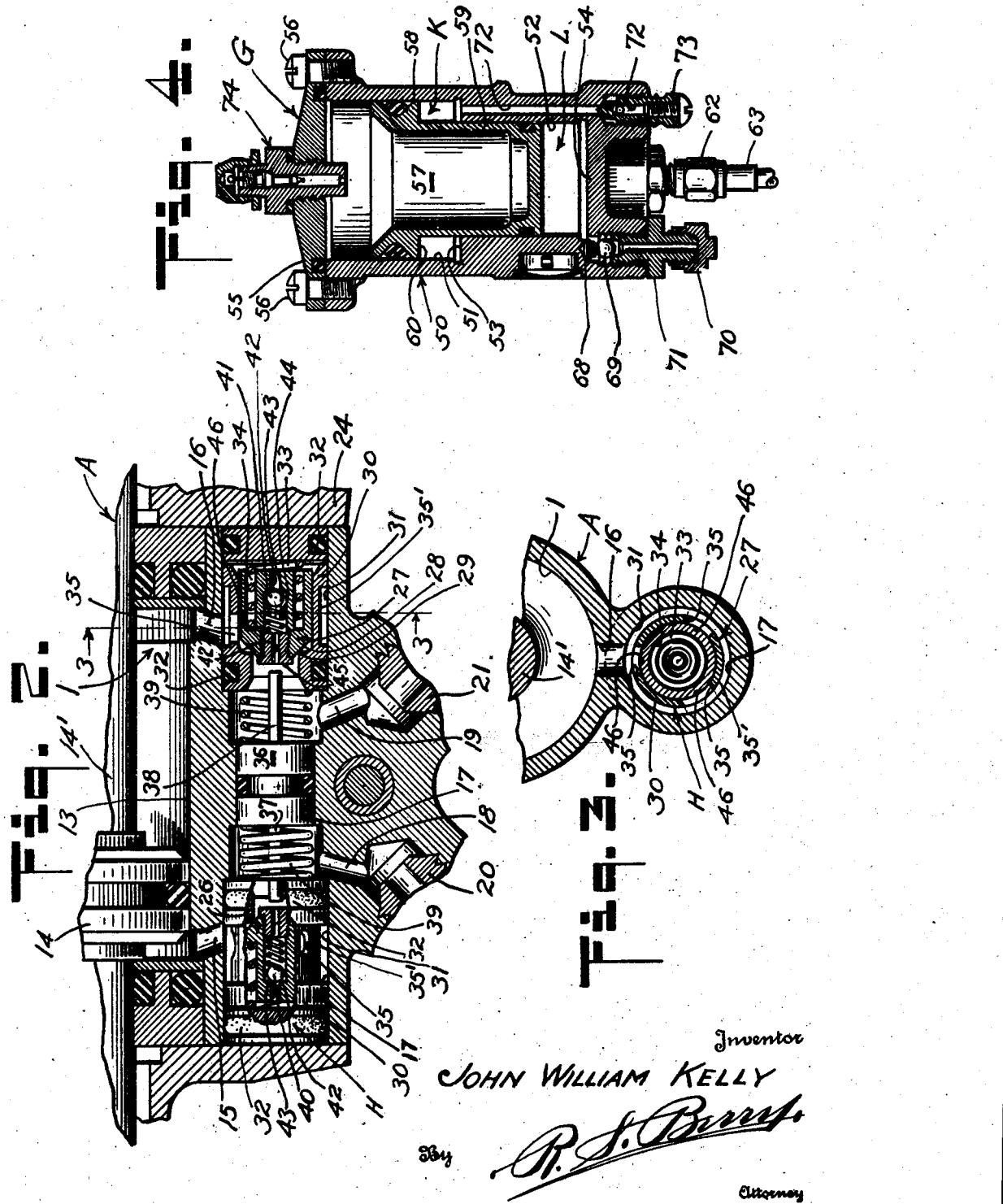

Patented Mar. 26, 1946

2,397,270

UNITED STATES PATENT OFFICE 2,397,270

HYDRAULIC REMOTE-CONTROL SYSTEM

John W. Kelly, La Canada, Calif., assignor to Adel Precision Products Corp., a corporation of California Application February 26, 1944, Serial No. 524,113

5 Claims. (Cl. 60—54.6)

This invention relates to hydraulic remote control systems, particularly the closed, manually operated type for operating aircraft engine throttles, other aircraft controls and various other devices and mechanisms subject to operation and control by such a system.

My pending application for United States Letters Patent Serial No. 475,301, filed February 9, 1943, for Hydraulic system exemplifies a system similar to that of the present invention. However, the present invention, while having desirable characteristics of my former system, embodies certain improvements over it and other systems heretofore used, such as the provision for pronounced reliability of performance, reduction of weight, size, bulk, number of parts, and amount of material, the elimination of poppet valves in the master or transmitter unit, simplification of construction, and the provision of a novel hydraulic lock and thermal relief valve combination in the receiver or motor unit. This combination of locking and relief valves likewise reduces weight, bulk, size and machining and other production costs while also making the system fully and accurately responsive at all times regardless of thermal changes and minor leakage, by reason of the efficient manner in which said combination responds to thermal changes and fluid displacement in cooperation with the master unit and a particular pressurized equalizing device or accumulator. This equalizer provides sources of supply of fluid under pressure connected to the dual fluid lines of the system to initially pressurize the system and maintain it pressurized and equalized under variable thermal and operating conditions.

One of the objects of the present invention is to provide an improved receiver or motor unit for hydraulic remote control systems, which unit embodies a "build in" coaxial valve combination including two hydraulic lock valves serving also as relief valves incident to contraction of the fluid, and two expansion relief valves embodied in the locking valves in a novel manner to conserve space, reduce machining costs, and render the unit as a whole more efficient and reliable.

Another object of my invention is to provide for a system such as described an improved equalizer of simple, light weight and comparatively inexpensive construction affording a most reliable equalizing action and initially pressurizing the system and maintaining it pressurized and equalized in a highly efficacious manner.

With the foregoing objects in view, together with such other objects and advantages as may subsequently appear, the invention resides in the parts and in the combination, construction and arrangement of parts hereinafter described and claimed, and illustrated by way of example in the accompanying drawings, in which:

Fig. 1 is a semi-schematic view of a system embodying the present invention, showing the transmitter and receiver units and the equalizer in longitudinal section;

Fig. 2 is an enlarged fragmentary sectional view of one of the combined locking valve and relief valve combination in the receiver unit;

Fig. 3 is a cross section taken on the line 3—3 of Fig. 2;

Fig. 4 is a sectional view of the equalizer taken at right angles to the section thereof shown in Fig. 1.

Referring to the drawings more specifically it is seen that a hydraulic remote control system, embodying my invention, includes a motor or receiver unit A, a drive or transmission means B operated thereby to actuate an airplane engine throttle or other control or device, not shown, a manually operable master or transmitter unit C, dual fluid lines D and E operatively connecting the transmitter and receiver units to one another, an operating means F for the unit C and a pressurized equalizer unit G connected to the lines D and E for thermal and other compensation and equalizing purposes in cooperation with a hydraulic lock and relief valve combination H embodied in the motor or receiver unit A, whereby the proper volume of fluid is maintained throughout the system under variable temperatures and minor leaks.

As here provided the master or transmitter unit C includes a cylinder 1 in which a piston 2 is reciprocable for transmitting operating fluid under pressure from either of the ports 3 and 4 through either of the lines D and E which latter are connected to said ports by means of suitable fittings 5.

The operating means F for the master unit C includes a lever 6 pivoted at 7 on a bracket 8 and connected by means of a link 9 with the piston rod 10 whereby the piston 2 may be selectively operated to direct operating fluid through either of the lines D and E.

A synchronizing passage 11 is formed in the wall of the cylinder 1 to by-pass fluid around the piston 2 and is controlled by means of a manually operated valve 12 which may also be used as a bleed valve to remove trapped air from the cylinder and system.

The motor or receiver unit A includes a cylinder 13 in which a piston 14 is reciprocable responsive to pressure fluid entering the ends of the cylinder through the ports 15 and 16, with which ports the lines D and E are afforded communication through a bore 17 in the wall of the cylinder 13, and ports 18 and 19. The ports 18 and 19 lead into fittings 20 and 21 to which the lines D and E are connected. The ports 18 and 19, the cylinder bore 17 and the ports 15 and 16 form fluid passages through which fluid passes to and from the ends of the cylinder 13.

The drive means B includes a lever 22 pivoted at 23 on a bracket 24 carried by the cylinder 13 and is connected by a link 23' to the piston rod 14'. This lever is connected in any suitable manner, not shown, with the airplane part, or other control or mechanism (also not shown) to be actuated by the motor unit A.

A synchronizing passage 25 and valve 25' therein are provided for the cylinder 13 in the same manner and for the same purpose as the passage 11 and valve 12 associated with the cylinder 1 of the master unit.

In accordance with this invention the flow of fluid to and from the cylinder 13 is controlled by check valves 26 and 27 mounted in the end portions of the bore 17 and these valves also serve to hydraulically lock the motor unit. The valve 26 is positioned between the port 15 and port 18 while the valve 27 is disposed between ports 16 and 19, whereby the flow of fluid to and from the line D and the left end of the cylinder, as shown in Fig. 1, is controlled by valve 26, and the flow through line E to and from the right end of the cylinder is controlled by valve 27.

Each of the valves 26 and 27 is tubular and has a conical end 28 adapted to seat on a seat 29 formed interiorly of one end of a cylindrical valve cage 30 in which the valve is reciprocable. The cage is fitted in a counterbore 31 in the bore 17 and is sealed at its ends by the sealing rings 32.

Springs 33 seated in recesses 34 in the valves 26 and 27 and bearing against the end walls of the bore 17 urge the valves against their respective seats. When the valves 26 and 27 are opened, fluid will flow through radial ports 35 in the cages 30 it being noted that the cages are provided with peripheral grooves 35' in registration with the radial ports 35 open to these grooves as shown in Fig. 5.

As a means for automatically controlling the check valves 26 and 27 a valve actuating piston 36 is arranged to reciprocate in the bore 17 between the valves so that stem members 37 and 38 extending from opposite ends of the piston will engage and open the valves. Springs 39 normally hold the valve actuating piston centered with the stem members somewhat spaced from the valve 26 and 27 as shown in Fig. 1. When pressure fluid enters the bore 17 from line D through port 18 the valve 26 will be opened responsive to the pressure of such fluid and the motor piston 14 will be moved to the right (see Fig. 1). At the same time that valve 26 is unseated by the fluid, the piston 36 is moved to the right whereby the stem 38 thereon will extend through the adjacent end of the cage 30 and engage and unseat the valve 27. Valve 27 now acts as a return valve to allow fluid to return from the right end of cylinder 1 into line E and thence to the master or transmitter unit cylinder 1.

When the pressure fluid is transmitted through line E the piston 36 moves to the left, valve 27 is opened by fluid pressure and valve 26 is opened by the stem 37 of the piston 36, thereby causing the piston 14 to be moved to the left.

It is now seen that when the piston 2 of the master or transmitter unit C is moved, by appropriate manipulation of the lever 6, to the right, the line D transmits fluid under pressure to the motor unit A and operates the valves 26 and 27 therein as hereinbefore noted to cause the piston to move to the right. Opposite movement of the master unit piston 2 will cause the opposite valve action hereinbefore described as well as movement of the motor piston 14 to the left.

A particular feature of my invention is the provision of a novel thermal expansion relief valve means embodied in the check valves 26 and 27 themselves, which latter also serve as fluid contraction compensating valves as well as provide for hydraulically locking the motor piston 14. This novel valve combination is provided for by means of ball check relief valves 40 and 41 in the valves 26 and 27 respectively, these ball checks being arranged in the relief passages 42 afforded by the tubular formation of the valves 26 and 27. In the relief passages 42 are seats 43 against which the ball valves 40 and 41 are urged by the springs 44 and the pressure of the fluid in the bore 17. Tubular keepers 45 hold the springs in the relief passages 42 and are disposed so that their outer ends are adapted to be engaged by the stems 37 and 38 on the valve actuating piston 36 to unseat the valves 26 and 27. Excessive pressure due to thermal expansion of fluid in the motor cylinder 13 will cause either of the relief valves 40 and 41 to open and permit of a compensating flow into the system through the ports 15 and 16 past the body of either of valves 26 and 27 which have a sufficiently loose fit in the cages to allow fluid to flow past them and against the relief valves 40 and 41.

I may as here shown provide minute groove-like passages 46 in the bodies of the valves 20 and 27 to afford communication of the relief passages 42 with the ends of the cylinder 13 when the valves 26 and 27 are seated, whereby the ball relief valves 40 and 41 are subject to being opened when excessive pressure is caused by thermal expansion of the fluid in the cylinder 13.

It is now seen that the valves 26 and 27 in having the check valves 40 and 41 embodied therein as herewith shown and described make for a small compact and highly efficient valve combination providing for hydraulic locking of the motor unit as well as for full thermal expansion and contraction compensation thereof.

The pressurized equalizer unit G hereof includes a cylinder 50 having coaxial bores 51 and 52 of differing diameters whereby an annular shoulder 53 is defined between said bores. A wall 54 closes the lower end of this cylinder whereas a cover or lid 55 is mounted on the upper end of the cylinder by means of the fastenings 56.

Mounted in the equalizer cylinder 50 is a dual piston 57 having a larger piston portion 58 operable in the larger bore 51 and a smaller integral piston portion 59 operable in the smaller bore 52. A fluid compensating chamber K is provided in the bore 51 between the shoulder or "end" 60 of the piston 57 and the shoulder 53 in the cylinder, whereas a second fluid compensating chamber L is provided in the bore 52 between the end of piston portion 59 and the wall 54 of the cylinder. A passage 61 extends through the wall of the cylinder 50 so that one end opens through the shoulder 53 into the chamber K while the other end extends through the lower wall 54 and receives a fitting 62 by means of which a conduit 63 connects the equalizer with the fluid line E. A similar passage 64 extends through the wall of the cylinder 50 so as to intersect as at 65 the lower end of the chamber L and at its lower end receives a fitting 66 by means of which a conduit line 67 is connected to the equalizer to afford communication of the chamber L with the line D.

A filler or fluid intake passage 68 corresponding to passage 64 is provided in the wall of the cylinder 50 and opens in the bore 52 or chamber L. A check valve 69 is mounted in passage 68 so as to unseat on introducing fluid through said passage into the equalizer. A removable screw cap 70 closes the outer end of the filling nipple and valve seat member 71 which is mounted in the intake passage 68.

A bleeder passage 72 corresponding to the passage 61 is formed in the wall of the cylinder 50 and opens into the chamber K. A screw valve 73 is mounted in the lower end of the passage 72 to control said passage whereby air trapped in the equalizer may be bled therefrom.

Hydraulic fluid is charged into the chambers K and L and the dual piston 57 is elevated accordingly following which air is introduced into the upper part of the bore 51 through a valved air intake 74 until sufficient air pressure is reached to initially pressurize the system. The equalizer now becomes in effect a dual fluid reservoir with the fluid in the chambers K and L under pressure and in direct communication with the fluid in the lines E and D of the system so that in the event of thermal expansion and contraction of the fluid in the cylinders of the units A and C and in the lines D and E, the equalizer will function to receive fluid from said lines or cause fluid to be discharged into the lines whereby the requisite volume of fluid is maintained throughout the system at all times. When thermal expansion takes place in the lines D and E and associated units, the increased pressure raises the dual piston in the equalizer so that the capacity of the chambers K and L is increased to accommodate the expanded fluid and thereby relieve the excess pressure in the system. Upon contraction of the fluid the air pressure in the equalizer forces the dual piston downward causing a compensating discharge of fluid into the system lines D and E.

While I have shown and described a specific embodiment of my invention I do not limit myself to the exact details of construction set forth, and the invention embraces such changes, modifications and equivalents of the parts and their formation and arrangement as come within the purview of the appended claims.

I claim:

1. In a hydraulic motor unit, a cylinder having a cylindrical bore in a wall thereof, cylinder ports affording communication between end portions of said cylinder and end portions of said bore; bore ports affording communication of said bore at points between said cylinder ports with the fluid lines of a hydraulic system, a motor piston in said cylinder, valve seats in said bore between the cylinder ports and the bore ports, spring loaded check valves mounted in said bore to seat in a direction toward said bore ports so that when both valves are closed the motor piston will be hydraulically locked against movement, a valve actuating piston means having a working fit in said bore between said bore ports and movable into positions for engaging and opening said valves, spring means normally holding said piston means in a position relative to said bore ports so that pressure fluid entering either bore port will open one of the valves and move the valve actuating piston means to engage and open the other valve, said check valves having thermal expansion relief passages affording communication between said bore ports and portions of said bore which are open to said cylinder ports when said valves are closed, and normally closed spring loaded relief valves arranged in said relief passages to open responsive to thermal expansion of the fluid in said cylinder, tubular valve cages in said bore having said seats at certain ends thereof and in which said check valves are operable, and radial ports in said cages affording communication of said bore ports with said cylinder ports when said check valves are unseated.

2. In a hydraulic unit, a cylinder having a pair of operating passages for delivering fluid under pressure to and discharging fluid from the ends of the cylinder, normally closed check valves arranged in said passages to open responsive to pressure of operating fluid being transmitted to the cylinder and to close responsive to pressure of fluid passing from said cylinder, valve opening means responding to the pressure of operating fluid in either of said passages to open one of the valves in the other passage while the valve in the passage into which the operating fluid is delivered is opened by the pressure of the operating fluid, relief passages in said check valves for by-passing fluid from said cylinder around said valves when the latter are closed, spring loaded check valves normally closing said relief passages and opening responsive to pressure in the cylinder created by thermal expansion of the fluid therein, while said check valves are closed, said relief passages extending axially through said check valves, cages mounted in said operating passages and enclosing said valves, valve seats on said cages, means sealing said cages around their ends, and ports in said cages affording flow of fluid therethrough and into said operating passages when said check valves are unseated.

3. In a hydraulic motor unit, a cylinder having a cylindrical bore in a wall thereof, cylinder ports affording communication between end portions of said cylinder and end portions of said bore; bore ports affording communication of said bore at points between said cylinder ports with the fluid lines of a hydraulic system, a motor piston in said cylinder, valve seats in said bore between the cylinder ports and the bore ports, spring loaded check valves mounted in said bore to seat in a direction toward said bore ports so that when both valves are closed the motor piston will be hydraulically locked against movement, a valve actuating piston means having a working fit in said bore between said bore ports and movable into positions for engaging and opening said valves, spring means normally holding said piston means in a position relative to said bore ports so that pressure fluid entering either bore port will open one of the valves and move the valve actuating piston means to engage and open the other valve, said check valves having thermal expansion relief passages affording communication between said bore ports and portions of said bore which are open to said cylinder ports when said valves are closed, normally closed spring loaded relief valves arranged in said relief passages to open responsive to thermal expansion of the fluid in said cylinder, tubular valve cages in said bore having said seats at certain ends thereof and in which said check valves are operable, radial ports in said cages affording communication of said bore ports with said cylinder ports when said check valves are unseated, and a tubular cage for the first named valve mounted in said bore and having the valve seat for the first named valve provided internally thereof, said cage having a port therein affording communication of the second port with said bore.

4. In a hydraulic motor unit, a cylinder having a cylindrical bore in a wall thereof, cylinder ports affording communication between end portions of said cylinder and end portions of said bore; bore ports affording communication of said bore at points between said cylinder ports with the fluid lines of a hydraulic system, a motor piston in said cylinder, valve seats in said bore between the cylinder ports and the bore ports, spring loaded check valves mounted in said bore to seat in a direction toward said bore ports so that when both valves are closed the motor piston will be hydraulically locked against movement, fluid pressure operable means in said bore between said bore ports to operate said check valves so that pressure fluid entering either bore port will act upon and open one of the valves and will at the same time act upon said means and thereby open the other valve, said check valves having thermal expansion relief passages affording communication between said bore ports and portions of said bore which are open to said cylinder ports when said valves are closed, normally closed spring loaded relief valves arranged in said relief passages to open responsive to thermal expansion of the fluid in said cylinder, and tubular valve cages in said bore having said seats at certain ends thereof and in which said check valves are operable, there being radial ports in said cages affording communication of said bore ports with said cylinder ports when said check valves are unseated.

5. In a hydraulic motor unit, a cylinder having a cylindrical bore in a wall thereof, cylinder ports affording communication between end portions of said cylinder and end portions of said bore; bore ports affording communication of said bore at points between said cylinder ports with the fluid lines of a hydraulic system, a motor piston in said cylinder, valve seats in said bore between the cylinder ports and the bore ports, spring loaded check valves mounted in said bore to seat in a direction toward said bore ports so that when both valves are closed the motor piston will be hydraulically locked against movement, fluid pressure operable means in said bore between said bore ports to operate said check valves so that pressure fluid entering either bore port will act upon and open one of the valves and will at the same time act upon said means and thereby open the other valve, said check valves having thermal expansion relief passages affording communication between said bore ports and portions of said bore which are open to said cylinder ports when said valves are closed, normally closed spring loaded relief valves arranged in said relief passages to open responsive to thermal expansion of the fluid in said cylinder, tubular valve cages in said bore having said seats at certain ends thereof and in which said check valves are operable, there being radial ports in said cages affording communication of said bore ports with said cylinder ports when said check valves are unseated, and a tubular cage for the first named valve mounted in said bore and having the valve seat for the first named valve provided internally thereof, said cage having a port therein affording communication of the second port with said bore.

JOHN W. KELLY.